United States Patent
Liu et al.

(10) Patent No.: US 9,481,919 B2
(45) Date of Patent: Nov. 1, 2016

(54) PRODUCTION OF HIGH GRADE NICKEL PRODUCT

(71) Applicant: BHP Billiton SSM Development Pty Ltd, Perth, Western Australia (AU)

(72) Inventors: Houyuan Liu, Henderson, NV (US); Omar Yesid Caceres Hernandez, Herriman, UT (US); Renato Antonio Loaiza Aguilar, Cordoba, CO (US); Carolina Isabel Meneses Rodriguez, Cordoba, CO (US); Ruben Rangel De Hoyos, Cordoba, CO (US); Illich Alvarez Mercado, Cordoba, CO (US)

(73) Assignee: CERRO MATOSO SA, Bogota (CO)

( * ) Notice: Subject to any disclaimer, the term of this patent is extended or adjusted under 35 U.S.C. 154(b) by 0 days.

(21) Appl. No.: 14/378,175

(22) PCT Filed: Feb. 13, 2013

(86) PCT No.: PCT/AU2013/000120
§ 371 (c)(1),
(2) Date: Aug. 12, 2014

(87) PCT Pub. No.: WO2013/120131
PCT Pub. Date: Aug. 22, 2013

(65) Prior Publication Data
US 2015/0000466 A1   Jan. 1, 2015

(30) Foreign Application Priority Data

Feb. 14, 2012   (AU) .............................. 2012900537

(51) Int. Cl.
*C22B 3/08*   (2006.01)
*C22B 3/42*   (2006.01)
(Continued)

(52) U.S. Cl.
CPC .......... *C22B 23/043* (2013.01); *C22B 3/0005* (2013.01); *C22B 3/08* (2013.01);
(Continued)

(58) Field of Classification Search
CPC ............ C22B 3/08; C22B 3/42; C22B 3/46; C22B 3/005; C22B 23/04; C22B 23/0461; C22B 23/0469
See application file for complete search history.

(56) References Cited

U.S. PATENT DOCUMENTS 3,093,559 A * 6/1963 White ....................... C22B 3/00
205/557
7,597,738 B2   10/2009 Liu et al.
(Continued)

FOREIGN PATENT DOCUMENTS

AU   WO 2009155651 A1 * 12/2009 ............ B01D 9/004
WO   WO 2006/029443      3/2006
(Continued)

OTHER PUBLICATIONS

PCT/AU2013/000120 International Search Report dated Mar. 5, 2013 (4 pages).

*Primary Examiner* — Roy King
*Assistant Examiner* — Tima M McGuthry Banks
(74) *Attorney, Agent, or Firm* — Brinks Gilson & Lione; G. Peter Nichols

(57) ABSTRACT

A process for the production of a high grade nickel product including the steps of: a) providing at least one heap of a nickeliferous lateritic ore and leaching that heap with a suitable lixiviant, preferably sulfuric acid solution, to produce a nickel rich pregnant leach solution (PLS); b) subjecting the PLS to an impurity removal step to precipitate ferric iron, and preferably partially precipitate aluminum and chromium as hydroxides; and c) recovering a high grade nickel product from the PLS preferably by either nickel ion exchange, solvent extraction, electrowinning, conventional multi-stage neutralization, pyrohydrolysis or sulfidation.

16 Claims, 6 Drawing Sheets

(51) Int. Cl.
    *C22B 3/46*     (2006.01)
    *C22B 23/00*     (2006.01)
    *C22B 3/00*     (2006.01)
    *C22B 3/26*     (2006.01)

(52) U.S. Cl.
    CPC ............... *C22B 3/42* (2013.01); *C22B 3/46* (2013.01); *C22B 23/04* (2013.01); *C22B 23/0453* (2013.01); *C22B 23/0461* (2013.01); *C22B 23/0469* (2013.01); *C22B 23/0484* (2013.01); *Y02P 10/234* (2015.11)

(56) References Cited

U.S. PATENT DOCUMENTS

| | | | |
|---|---|---|---|
| 7,935,171 B2 * | 5/2011 | Ratchev | C22B 3/42 205/589 |
| 2008/0016986 A1 | 1/2008 | Liu et al. | |
| 2009/0056502 A1 | 3/2009 | Mendes et al. | |
| 2010/0154593 A1 | 6/2010 | Ratchev et al. | |
| 2011/0056333 A1 * | 3/2011 | Liu | C22B 23/005 75/743 |
| 2011/0120267 A1 | 5/2011 | Roche | |
| 2011/0283831 A1 * | 11/2011 | Roche | C22B 3/46 75/10.67 |
| 2012/0186398 A1 * | 7/2012 | Dreisinger | C22B 3/0005 75/743 |

FOREIGN PATENT DOCUMENTS

| | | |
|---|---|---|
| WO | WO 2008/022381 | 12/2008 |
| WO | WO 2009/026693 | 3/2009 |
| WO | WO 2009/155651 | 12/2009 |

* cited by examiner

PRODUCTION OF HIGH GRADE NICKEL PRODUCT

This application claims priority to International Application No. PCT/AU2013/000120 filed 13 Feb. 2013 and Australian Patent Appln. 2012900537 filed 14 Feb. 2012, the entire contents of each are incorporated herein by reference.

The present invention relates to a comprehensive process to exploit a whole nickeliferous lateritic ore deposit that includes heap leach for the recovery of nickel and cobalt from a nickeliferous lateritic ore deposit. In one embodiment, it relates to a heap leach process for the recovery of nickel and cobalt from low grade ore fractions and/or ore fractions with a $SiO_2/MgO$ weight ratio that is not generally suitable for use in a conventional rotary kiln and electric furnace (RKEF) process. In another embodiment, it relates to the production of a high grade nickel product from a heap leach process that may be useful for value added nickel products. In a preferred embodiment, the invention is particularly applicable to the integration of a nickel hydroxide precipitate (NHP) produced following a heap leach process into feed material for a conventional RKEF process so as to produce a ferronickel product.

BACKGROUND OF THE INVENTION

Nickeliferous lateritic ores are potentially the world's largest source of nickel and cobalt. In general, most deposits of nickel/cobalt laterites contain three major zones based on lithology, mineralogy and chemical composition. These three zones from the base to the surface, are the saprolite zone, the transition zone and the limonite zone, and generally sit atop weathered soil material. There is generally a large variation in total thickness of the nickeliferous lateritic ore deposit, as well as individual zone thickness.

The saprolite zone consists predominantly of "saprolitic serpentine minerals" and a large variety of nickel/magnesium silicate minerals. It contains between 0.5% wt and 4% wt nickel and a higher magnesium content, which is normally over 6% wt. The cobalt to nickel weight ratio of saprolite is normally less than 1:10.

The limonite zone, located on the top zone of nickeliferous lateritic ore body, contains nickel ranging from about 0.5% wt to 1.8% wt and consists of goethite-rich, magnetite-rich and/or hematite-rich ore, which is rich in iron, nickel and cobalt content. As it is the top zone, it is subjected to greater weathering which is characterised by a decrease in magnesium content and fine particle size, and an increase in the iron content. Therefore, it has lower magnesium content than saprolitic type ore.

Depending on weathering extent, limonitic ore contains dominantly fine and soft particles of goethite and/or hematite. Sometimes weathering has not been fully completed and magnetite rich sections are present. Alternatively, depending upon the climatic condition, there is formation of clay-type nickeliferous lateritic ores that contain nickel and/or cobalt containing iron/magnesium/aluminium silicates, such as smectite, nontronite and chlorite.

The transition zone is not normally well defined and is composed essentially of limonite and saprolite. It also commonly contains nickel in the range of from 1% wt to 3% wt. with co-existing cobalt ranging from 0.08% wt up to 0.3% wt.

Cobalt existence in zones of saprolite, limonite and transition is generally associated with asbolane, a mineral of hydrated manganese oxide. The cobalt value of a nickeliferous lateritic ore deposit is mostly recovered from the limonitic and transition zones.

Although nickeliferous lateritic ore deposits are exploitable with surface mining, they have historically been overlooked in favour of underground sulfide deposits as the nickel is readily concentrated by floatation techniques. This is despite the abundant source of nickel bearing laterite ore. Most nickeliferous lateritic ores are generally considered a lower grade of nickel bearing ore for whole ore refining, and more difficult to recover the nickel than from sulfide ores. However, as sulfide ore deposits begin to disappear, nickeliferous lateritic ore deposits are increasingly becoming an important source of nickel and cobalt.

The process for extracting nickel and cobalt from nickeliferous lateritic ores is generally confined to expensive and/or energy intensive methods. For example, it is known to directly smelt nickeliferous lateritic ore in furnace, which is quite an energy intensive process. In particular, the saprolitic component may be processed by pyrometallurgical means such as a rotary kiln and electric furnace (RKEF) process. The selected saprolite fraction should meet the specification of nickel grade and $SiO_2/MgO$ weight ratio settled by economics and slag-making conditions in smelter. In RKEF processing, the saprolitic fraction of a nickeliferous lateritic ore with reduced nickel and partially reduced iron is sent to an electric furnace for final reduction to metal as a ferronickel product. The RKEF process employs large rotary kilns to dry, calcine and reduce the nickel/iron bearing lateritic ores followed by a transfer to alternating current (AC) electric furnaces for smelting to ferronickel products. The slag is generally discarded. In some RKEF process, the slag is subjected to a further process named Metallic Nickel Recovery (MNR) from slag, which consist of physical separation steps (milling and electromagnetic separation) in order to increase nickel recovery as ferronickel.

The limonite component of a nickeliferous lateritic ore is generally processed in a hydrometallurgical process, such as a High Pressure Acid Leach (HPAL) process with concentrated sulfuric acid. This is a highly corrosive process requiring expensive and sophisticated equipment such as autoclaves, flash tanks etc. to perform the operation. Both the pyrometallurgical RKEF process and the hydrometallurgical HPAL process require a certain grade of nickel ore to make them economically viable.

Heap leaching is a method for economically extracting metals from ores that may not be suitable for either RKEF or HPAL processes. Generally, heap leaching simply involves stacking raw ore, taken directly from an ore deposit, into heaps that vary in height (4-7 m). The leaching solution (lixiviant) is irrigated upon the top of the heap to percolate down through the heap to produce a pregnant leach solution (PLS).

It has been found that the permeability of nickeliferous lateritic ore is largely controlled by the type of lithology, mineral morphology and particle size of the ore. Although the mineralogy of nickeliferous lateritic ore is rather complex and widely variable from deposit to deposit, there is some commonality or similarity of mineral morphology in the world-wide nickeliferous lateritic ore deposits. These morphological structures enhance permeability of solution, driven by blend ratios, and preserve physical stability of individual minerals.

Heap leaching of nickeliferous oxidic ore has been proposed in recovery processes for nickel and cobalt and is described, for example, in U.S. Pat. Nos. 5,571,308 and 6,312,500, both in the name of BHP Minerals International, Inc.

U.S. Pat. No. 5,571,308 describes a process for heap leaching of high magnesium containing nickeliferous lateritic ore such as saprolite. The patent points out that the fine saprolite exhibits poor permeability and a solution to this, pelletisation or agglomeration of the ore is necessary to ensure distribution of the lixiviant through the heap.

U.S. Pat. No. 6,312,500 also describes a counter-current process for heap leaching of laterites to recover nickel and is particularly directed to ores that have a significant clay component (greater than 10% by wt.). This process includes sizing of the ore where necessary, forming agglomerates by contacting the ore with a lixiviant, and agglomerating. The pellets are formed into a heap and leached with sulfuric acid solution to extract the metal values. In addition to fresh water, the sulfuric acid fortified seawater, recycled solutions such as raffinates or process water may be used as a lixiviant.

U.S. Pat. No. 7,597,738, in the name of BHP Billiton SSM Development Pty. Ltd. describes a process for the production of ferronickel with mixed iron/nickel hydroxide precipitate from a heap leach/ion exchange (IX) process. The pregnant leach solution (PLS) from the heap leach process, having a pH in the range of 1.5-2.0, is treated with an ion exchange resin with functional group of bis-picolylamine to separate nickel from impurities such as ferrous ions $Fe^{2+}$, Al, Cr, Mg and Mn with the exception of ferric ions. The preferred resin is Dowex M4195™, which has considerable affinity for Ni and ferric ions. As the PLS has a high Fe/Ni concentration ratio, the effective capacity of resin to load nickel is reduced, given that it will also co-load considerable quantities of ferric iron. This leads to the need for high investment in IX resin and equipment to maintain a given nickel production capacity. In addition, the high iron content in the IX eluate increases the reagent consumption to produce a mixed iron/nickel hydroxide precipitate (MHP) and decreases the nickel content in the MHP and therefore, the final product of ferronickel.

International application PCT/AU2006/000606 (in the name of BHP Billiton SSM Technology Pty Ltd) also describes a process where nickeliferous oxidic ore is heap leached using an acid supplemented hypersaline water as the lixiviant.

Heap leaching of laterites by sulfuric acid at ambient temperatures is also reported in various publications for example, by S. Agatzini, in the paper published in Hydrometallurgy 1994, Institution of Mining and Metallurgy, London 1994, page 193-208 titled "*Heap Leaching of Poor Laterites*".

Heap leaching nickeliferous lateritic ores offers the promise of a low capital cost process and rapid ramping-up, eliminating the need for expensive and high maintenance high pressure equipment required for conventional high pressure acid leach processes. Generally, in a heap leach process of nickeliferous lateritic ores, a relatively stronger acidic lixiviant than conventional copper heap leach is used to liberate both the cobalt and nickel from the cobalt and nickel containing ores.

Ashok D Dalvi et al ("*The Past and Future of Nickel Laterite*", Inco Limited, PDAC 2004 International Convention, Trade Show & Inventor Exchange, Mar. 7-10, 2004) discloses that the RKEF process and the HPAL process become relatively unattractive if the feed nickel grade falls below 2% for the RKEF process and 1.4% for the HPAL process. In addition, in order to prevent corrosion of furnace lining and to control the amount of slag "super heat" required to enable tapping of the ferronickel in the RKEF process, the $SiO_2/MgO$ weight ratio of feed ore should be either greater than 2.5 or less than 2. As a result of these two constraints, relatively large quantities of nickeliferous lateritic ore becomes unsuitable for RKEF processing and is either stockpiled as so called "low grade ore" or kept unexploited. There is estimated to be ten million tons of ore that have been stockpiled in recent history, either with a nickel grade of between less than about 1.5% wt or with unsuitable $SiO_2/MgO$ wt. ratio and not processed because of its lack of suitability for either RKEF, or indeed high pressure leach processing.

It is a desired feature of the present invention to develop a comprehensive process where the nickeliferous lateritic ore can be commercially utilised in a conventional RKEF process, particularly so called low grade nickeliferous lateritic ore.

It is a further desired feature of the present invention to develop a process where a product from a heap leach process can be integrated into a conventional RKEF process.

It is a further desired feature to develop a process to produce a high grade nickel product that may be suitable for further processing to produce value added nickel products such as nickel cathodes, nickel nuggets or battery chemicals.

A reference herein to a patent document or other matter which is given as prior art is not to be taken as an admission that document or matter was known or that the information it contained was part of the common general knowledge as at the priority date of any of the claims.

BRIEF DETAILS OF THE INVENTION

The present invention relates to a heap leach process to produce a high grade nickel product, preferably a nickel hydroxide precipitate (NHP) from a nickeliferous lateritic ore. One particularly preferred use of this high grade nickel product is that it may suitably be integrated into a conventional rotary kiln and electric furnace (RKEF) process. Another preferred embodiment is that the high grade nickel product may be used for other value added nickel products.

In one embodiment of the invention, the invention resides in a process for processing low grade nickeliferous lateritic ore that may not ordinarily be suitable for using either in a pyrometallurgical RKEF process or a hydrometallurgical high pressure acid leach (HPAL) process. The invention described herein is particularly applicable to producing a high grade nickel product that is suitable for combining with an RKEF feed material and processing in an RKEF process, and will be described herein with reference to that embodiment. It will however be understood that other applications for the nickel product, such as in an HPAL process, or in other refining processes such as a Caron process, or for use in producing other value added nickel products such as battery material, nickel nuggets, nickel cathode or the material for electric nickel coating may still apply.

As used herein, the term "high grade nickel product" is understood to refer to a nickel product where most of the impurities, such as iron (ferrous and ferric), aluminium, chromium, manganese and magnesium have been removed. In the preferred process described herein, such impurities are generally removed from the PLS following a heap leach process by precipitation and an IX process. The preferred high grade nickel product is a nickel hydroxide precipitate (NHP) following precipitation from a nickel concentrated IX eluate.

As used herein, the term "high grade nickeliferous lateritic ore" is understood to be ore that is economically viable to be processed by conventional RKEF processes. Without being limited to a particular value, this is generally considered to be an ore having greater than 1.5% wt nickel content and the $SiO_2/MgO$ weight ratio either less than 2.0 or greater than 2.5.

As used herein, the term "low grade nickeliferous lateritic ore" is understood to be an ore generally discarded or kept unexploited as either not having significant nickel content or suitable $SiO_2/MgO$ weight ratio to make it commercially viable to process by either HPAL or conventional RKEF processes. Without being limited to a particular value, this is generally considered to be an ore having less than 1.5% wt of nickel content or the $SiO_2/MgO$ ratio is between 2.0 and 2.5.

As used herein, the term "nickel rich pregnant leach solution" or "PLS", in context means a solution that includes the majority of the leached nickel value. Without being limited to a particular value, but by way of example, when leaching a low grade nickeliferous ore, the nickel rich PLS will include from about 2.4 to 4.8 g/L nickel and from 0.08 to 0.6 g/L cobalt.

As used herein, the term "nickeliferous lateritic ore" is understood to be an oxidic ore that includes nickel. It will also generally include cobalt. It includes all fractions of lateritic ore, including saprolite, limonite, smectite, nontronite, chlorite and transition zone fractions among them unless otherwise specifically referred to.

In particular, in a most preferred embodiment of the invention, the present invention resides in a comprehensive process for the production of a high grade nickel product, produced by heap leaching a low grade nickeliferous lateritic ore followed by an IX process and producing that high grade nickel product from the nickel concentrated eluate from the IX process. In this embodiment, the low grade nickeliferous lateritic ore would not generally be suitable for use in an RKEF process, as it would have a nickel content less than 1.5% wt and/or an $SiO_2/MgO$ ratio between 2.0 and 2.5. The high grade nickel product, which is most preferably a nickel hydroxide precipitate (NHP) may then be combined with a feed material for an RKEF process and processed in an RKEF process. The feed material for the RKEF process is generally a high grade nickeliferous ore. The final nickel product produced by the process is most preferably a ferronickel product.

With additional conventional technology, in another embodiment of the invention, other high value-added derivative products may be produced from the high grade nickel product, such as high purity nickel hydroxide ($Ni(OH)_2$) for battery material or nickel sulphate crystal ($NiSO_4.7H_2O$) for electric coating and nickel cathodes. Generally, run of mine ore, whether it is high grade or low grade, may be processed for this embodiment.

In one embodiment, the present invention resides in a process for the production of a high grade nickel product including the steps of:
 a) providing at least one heap of a nickeliferous lateritic ore and leaching that heap with a suitable lixiviant, preferably sulfuric acid solution, to produce a nickel rich pregnant leach solution (PLS);
 b) subjecting the PLS to an impurity removal step to precipitate ferric iron, and preferably partially precipitate aluminium and chromium as hydroxides; and
 c) recovering a high grade nickel product from the PLS preferably by either nickel ion exchange, solvent extraction, electrowinning, conventional multi-stage neutralization, pyrohydrolysis or sulfidation and other technologies Most preferably, the present invention resides in a process wherein the nickel rich PLS, substantially free of ferric ion, is subjected to a nickel ion exchange (IX) step to produce a nickel concentrated IX eluate and an IX raffinate ("the nickel IX raffinate") containing cobalt and rejected impurities such as ferrous ion, aluminium, chromium, manganese and magnesium, and the nickel concentrated IX eluate is neutralized to produce a high grade nickel product, preferably a nickel hydroxide precipitate. Further, it is preferred that the high grade nickel product is combined with a feed material for a Rotary Kiln and Electric Furnace (RKEF) and processing that combined product in an RKEF process, preferably to produce ferronickel.

It is most preferred in this process to remove ferric iron as an impurity by precipitation. In a preferred embodiment, this step is conducted prior to the nickel IX step, so as to increase the IX resin effective capacity to load nickel. Many resins also have a high affinity to load ferric ions, so if the ferric iron is removed before the IX step, the resin has greater capacity to load nickel. A preferred IX process utilises ISEP™ equipment to ensure continuous, stable and high capacity operation, and removing the ferric iron prior to the IX step reduces the size and/or number of ISEP™ equipment relied upon, and the capital investment in resin. It also decreases the reagent consumption used to precipitate nickel as nickel hydroxide. The preferred reagent to precipitate nickel as nickel hydroxide from the nickel concentrated IX eluate is MgO, and cost savings can be found for the relative quantity of nickel recovered, if nickel is precipitated as nickel hydroxide rather than a mixed nickel/iron hydroxide.

Further, a high grade nickel hydroxide precipitate benefits the downstream RKEF production capacity and water balance in the process The nickeliferous lateritic ore that may typically be used in the heap leach process may generally be saprolitic, smectite and nontronite type ore, however the run-of-mine ore may be used under specified heap permeability, which may include fractions of limonitic and transitional or a blend of lateritic type ores.

The ore to be processed is generally run-of-mine (ROM) nickeliferous lateritic ore. If the final use of the ore is for an RKEF process, a first step would be to separate the high grade nickeliferous lateritic ore from the low grade nickeliferous lateritic ore. The high grade ore is the feed material for the RKEF process, while the low grade ore is processed to produce the high grade nickel product in accordance with the process described.

Alternatively, the high grade and low grade fractions may be sourced from different areas, and the low grade ore may be for example, discarded scats and previously considered waste material.

In the embodiment where the high grade nickel product is to be used in a process for the production of nickel value added products such as battery material or nickel cathodes, the whole ROM ore may be processed in accordance with the process described, whether that includes processing high grade or low grade nickeliferous lateritic ore, or a combination of both ores.

The ore preparation for the heap leach process will generally include agglomeration or pelletisation with sulfuric acid and freshwater and/or recycled solution prior to leaching in order to maintain high percolation flux and to provide accelerated initial heap leaching kinetics. Agglomerisation or pelletisation may occur in a standard agglomerator such as a rotary disk, drum or other suitable apparatus known to those skilled in the art. Further, the heap porosity (voidage) formed by agglomerates or pellets also enables the heap to entrain precipitated iron hydroxide inside the heap and decreases acid consumption by making larger particles from the finer particles.

In some circumstances, the low grade nickeliferous ore may consist of the rocky and larger particle sized nickeliferous lateritic ore or high silica content ore in any event, which may require less or even no agglomeration. This is particularly so if the fines and clay material have been removed from the low grade ore for further processing either by pressure or atmospheric agitation or tank leach or indeed by RKEF processing, leaving just the coarser rejects fraction. It is preferred however to agglomerate or pelletise the ore prior to heap leaching.

In order to agglomerate the ore, a nickeliferous lateritic ore may be crushed so that the particle size is preferably less than about 63 mm. The particles may then be agglomerated or pelletised by mixing the crushed nickeliferous lateritic ore particles with a concentrated acid, for example in a rotary disk, drum or other suitable apparatus. Concentrated sulfuric acid is a preferred acid. The amount of acid used for agglomeration is generally the amount required to initially attack the nickel containing mineral matrix. In general, the amount of acid needed ranges from about 0 kgs to about 125 kgs of acid per ton of dry ore, depending on the ore mineral characteristics such as saprolite or limonite or smectite/nontronite/chlorite, as well as moisture.

The pellets are then formed into a heap having a base and a top. An acidic leach solution again, preferably sulfuric acid solution, is applied to the top of the heap and allowed to percolate downward through the heap. The leach solution is collected at the bottom and may be recycled to the heap for increasing nickel/cobalt concentration, or discharged to downstream for nickel and/or cobalt recovery.

Preferably, a plurality of heaps is formed and arranged in at least a primary and a secondary heap, the process including the steps of:
 a) forming at least a primary and secondary heap of nickel nickeliferous lateritic ore;
 b) adding the lixiviant, preferably sulfuric acid solution, to the secondary heap to produce an intermediate leach solution (ILS); and
 c) adding at least a part of the ILS to the primary heap to leach the primary heap in a counter current process; and
 d) producing a nickel rich and low acidity pregnant leach solution (PLS) for downstream nickel and/or cobalt recovery.

This two stage counter current acid leach allows for greater ferric iron precipitation or control inside heaps and decreases acid consumption and neutralizer consumption of overall plant. Three or more heaps may also be arranged in a continuous counter current arrangement.

The ILS is rich in nickel and cobalt with considerable acidity, but also contains ferric iron and a number of other impurities. The counter current heap leach process has the advantage of lowering acid consumption, and also achieves lower iron concentration and higher nickel concentration in the nickel rich PLS and results in a cleaner product liquor of lower acidity than the single pass heap leach system.

Generally, the pregnant or primary leach solution is monitored for its acidity, nickel and impurity content and ratios. For example, if it has a pH greater than 2, it can be fed to downstream processing and nickel recovery. If the pregnant leach solution has a pH of less than about 2, it is acidified and used to leach the next secondary heap in the counter current process.

Although most ferric ions are precipitated and entrained inside the heap with a counter-current leach, the PLS is not free of ferric ions. The dissolved ferric ions may be removed from the nickel rich PLS, generally as gypsum-goethite mixture, goethite and/or hydroxide, by adjusting the pH to a level from 2 to 4, preferably 2.5 to 3 and more preferably about pH 3, preferably with calcium carbonate or limestone, and preferably raising the temperature to 65° C. to 98° C. However, the selection of iron precipitate morphology as goethite instead of amorphous iron hydroxide that is formed at ambient temperature and pH 3 decreases the nickel/cobalt losses caused by co-precipitation. An alternative is to use seawater or saline medium so as to precipitate the ferric iron as jarosite. Generally this will occur at a pH of from 1 to 2 and a temperature of 80° C. to boiling point.

The downstream nickel and/or cobalt recovery from the nickel rich PLS may be by either an ion exchange (IX), solvent extraction (SX), electrowinning (EW) or conventional multi-stage neutralization to produce nickel/cobalt hydroxide, or pyrohydrolysis to produce nickel/cobalt oxides or sulfidation to produce nickel/cobalt sulfides. It is however preferred that IX technology is engaged as a one stage treatment that allows for nickel recovery and separation from impurities such as $Al^{+3}$, $Cr^{+3}$, $Fe^{+2}$, $Mn^{+2}$ and $Mg^{+2}$, with the benefit of nickel/cobalt losses being significantly lower than that of conventional multi-stage neutralization. Whereas the process of the present invention is not limited to the use of IX technology to separate nickel from large parts of the impurities in the PLS, it is the particularly preferred process, particularly as the use of ISEP™ technology ensure continuous, stable and high capacity operation. The applicants have found that with the use of such technology a particularly high grade nickel hydroxide product may be produced, that is not only suitable for use as a feed material in an RKEF process, but may be used for other applications requiring high grade nickel product such as for battery chemicals, nickel nuggets, material for electric coatings or nickel cathodes. It is convenient however to describe the invention with reference to the use with IX technology for this separation/purification step.

The commercial IX resins are preferably an iminodiacetic acid (IDA) chelating cation resin, for example Amberlite IRC 748™, Purolite S 930™ or Lewatit TP207™ or a bis-picolylamine (BPA) functional chelating resin, for example Dowex M4195™. The affinity of ferric ion to IDA-type resin is several magnitudes orders higher than nickel ion at pH2 so that the pre-precipitation of ferric iron is most desired in application of this kind of resin. On the contrary the affinity of ferric ion to BPA resin is about half as that of nickel ion, however the pre-treatment to remove ferric iron remains most preferred in the process.

After contacting with the nickel rich PLS, the loaded IX resin is eluted with a medium strength acid solution (190-250 g/L), most preferably sulfuric acid however hydrochloric acid may also be used, to produce a nickel concentrated eluate, leaving the majority of the cobalt in the raffinate together with almost all the impurities such as aluminium, chromium, ferrous iron, manganese and magnesium.

In a preferred embodiment, the nickel product produced following the heap leach process is a nickel hydroxide product. Most free acid and some ferric iron is removed from the nickel concentrated IX eluate by raising the pH to about 2-4, preferably 2.5 to 3 and at a temperature of 30° C. to 60° C., preferably 40° C. to 50° C. The pH is controlled by the addition of a neutralizing agent to neutralize acid, for example the neutralizing agent may be limestone or calcium carbonate. Under these conditions, any residual ferric iron will precipitate as goethite and/or an iron hydroxide without adverse loss of nickel, while gypsum will also be discarded as solid residue After solid/liquid separation, the partially neutralized nickel concentrated eluate is further neutralized with, for example, magnesium oxide, soda ash or caustic soda (sodium hydroxide) or other alkali, to a pH of from 7 to 9 and at ambient temperature or from 30° C. to 60° C., preferably 40° C. to 50° C. This will generally produce a nickel hydroxide product with a nickel grade of greater than 30% wt and iron less than 1.0% wt. The barren solution is recycled to the heap leach or IX operation.

The high grade nickel hydroxide product may be further processed for a number of value added products, for example for battery chemicals, the material for electric coatings or nickel cathodes, as it is of sufficient high grade quality. However, a preferred use is to blend this product with the feed nickeliferous lateritic ore of existing RKEF plant and feed the blended material to an RKEF process. In a preferred process, this will produce a ferronickel product. With the introduction of this high grade nickel hydroxide product into the feed material of an RKEF process, the production capacity and mining life of an RKEF plant is increased because the overall feed nickel grade is raised and more nickeliferous lateritic ore is exploitable.

The feed material for the RKEF process will generally be a high grade nickeliferous ore having a nickel content of greater than 1.5% wt with appropriate $SiO_2$/MgO ratios.

About 60-80% of cobalt in the PLS is rejected into the nickel IX raffinate. This amount of cobalt may then be recovered by either sulfidation, a further ion exchange (IX) step, or solvent extraction (SX). In general, any cobalt in the nickel IX eluate is not recovered because of the low concentration or low commercial value.

In a preferred cobalt recovery process, the nickel IX raffinate may be bled of impurities such as iron, aluminium, chromium, manganese and magnesium prior to cobalt recovery. In one embodiment the IX raffinate may be first partially neutralized to a pH of 3 to 4 at 30° C. to 60° C. by the addition of calcium carbonate and air, to precipitate iron as goethite or hydroxide and at least some aluminium and chromium as hydroxides. In an alternative embodiment, the flowsheet is designed where the ferric iron and aluminium are precipitated in a sequential manner from the IX raffinate, thereby limiting the amount of solids generated that have poor filtration behaviour.

In this embodiment, the majority of ferric iron is precipitated at a pH of from 2 to 4, preferably about 2.5 to 3, and then the pH is raised to precipitate any residual ferric iron and all of the aluminium at a pH of about 5.0 to 6.5, preferably about 6. Preferably a 20% limestone slurry is used to neutralize all the free acid (about 5 g/l) to precipitate the iron and aluminium but other neutralizers such as calcium carbonate or lime may be used. In a preferred embodiment, limestone is used in the initial precipitation tank or tanks, and lime is used in the second stage precipitation tank or tanks.

In this two stage precipitation concept from the nickel IX raffinate, preferably multiple reactors are used. The initial precipitation reactors may operate at a temperature of form 30° C. to 60° C., preferably 50° C. to 60° C. and most preferably about 55° C. A limestone slurry is the preferred neutralizing agent and is fed predominantly to the first reactor to achieve process target pH. The initial pH is operated preferably at around 2.5 to 3.

Because of the pH profile, it is preferred to insert an intermediate thickener between the two precipitation circuits, otherwise the $Al(OH)_3$ produced will redissolve when returned to a reactor at pH 2.5 to 3. Air or oxygen may be added as an oxidant in this initial precipitation circuit to assist in oxidising any ferrous to ferric, and to achieve a desired ORP of −80 to −160 my referred to Pt/AgCl probe. The use of limestone in this first stage of precipitation will allow for precipitation of gypsum and iron as crystalline magnetite and/or goethite.

In order to complete precipitation of both the ferrous iron and aluminium, preferably temperatures are of from 60° C. to 100° C., more preferably above 95° C., as it has been found to promote the formation of crystalline precipitates, especially aluminium hydroxide at these temperatures. Formation of the crystalline precipitates can have a dramatic impact on the filtration rate of the precipitate. Lime may be used as the neutralizing agent to complete precipitation of both the ferrous iron and aluminium, which has the benefit of providing flexibility when contacting the pH circuit, without the risk of overdosing the circuit and having unreacted limestone in the precipitate.

This two stage precipitation step also provides an opportunity to eliminate a problem of unreacted limestone in the residue by using lime rather than limestone to precipitate the aluminium. This process also enables the production of a crystalline iron precipitate followed by the precipitation of an amorphous aluminium hydroxide material, which given the expected solution compositions would be a much smaller mass than the iron rich precipitate.

One hypothesis to improve the residue to produce a more crystalline iron residue such as goethite was to operate at a lower pH, thereby reducing the rates of precipitation and hence favouring particle growth over formation of new nuclei. It was found however that by increasing the temperature and maintaining the pH between 5 to 6.5, that due to the impact of increasing temperature, that the oxygen partial pressure was dramatically reduced within the system. It was particularly found that there is a dramatic change in oxygen partial pressure once the system is raised above 95° C. Magnetite can occur with a very low oxygen partial pressure. Therefore, it has been found that magnetite may be precipitated from the nickel IX raffinate with a very low oxygen partial pressure. Therefore, it should be possible to precipitate magnetite without the requirement for introducing air.

It was also found that ferrous will remain soluble at very low oxygen partial pressures. This means, some minor quantities of air or air nitrogen mixture, may be required to ensure complete precipitation of ferrous if operating at a pH below 5. However, when operating at a pH above 5, ferrous may be precipitated as magnetite without the addition of air or oxygen.

The testwork has confirmed that operating this impurity removal step at a higher pH of between 5 to 6.5 is preferred on a design basis. The reason for this is that oxidation of ferrous to ferric is rapid, thereby eliminating the need for use of pure oxygen or high energy agitation systems. This will reduce design complexity and hence the capital expenditure and operation expenditure of the process.

The cobalt will remain in solution and after solid/liquid separation, the cobalt may be recovered by further IX, for example with a BPA-type resin such as Dowex M4195™, or by sulfidation, for example by the addition of hydrogen sulphide gas, sodium sulphide or sodium bisulfide, or by solvent extraction, for example with the use of the reagent Cyanex 272™.

The cobalt barren raffinate is further neutralized, preferably with lime to a pH of 9-11 at 20° C. (ambient temperature) to 60° C., preferably 30° C. to 50° C. and aeration to precipitate magnesium and manganese as magnesium and manganese (III or IV) hydroxide. The magnesium and manganese barren solution may then be recycled for use in the heap leach or IX unit operation as lixiviant after acidification, or rinsing solution.

DETAILED DESCRIPTION OF THE DRAWINGS

Figure 1:
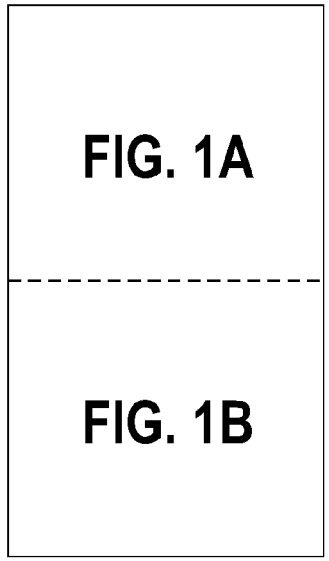
FIG. 1 discloses the flowsheet of two optional processes in accordance with the invention. The first process discloses the two stage heap leach process followed by blending of a nickel hydroxide precipitate with a feed nickeliferous lateritic ore for an RKEF pyrometallurgical process. The second process operates the two stage heap leach process to produce a nickel hydroxide precipitate that could be further processed for manufacture of more value added products such as battery material, nickel cathodes, nickel nuggets or the material for electric coatings.
Figure 1A:
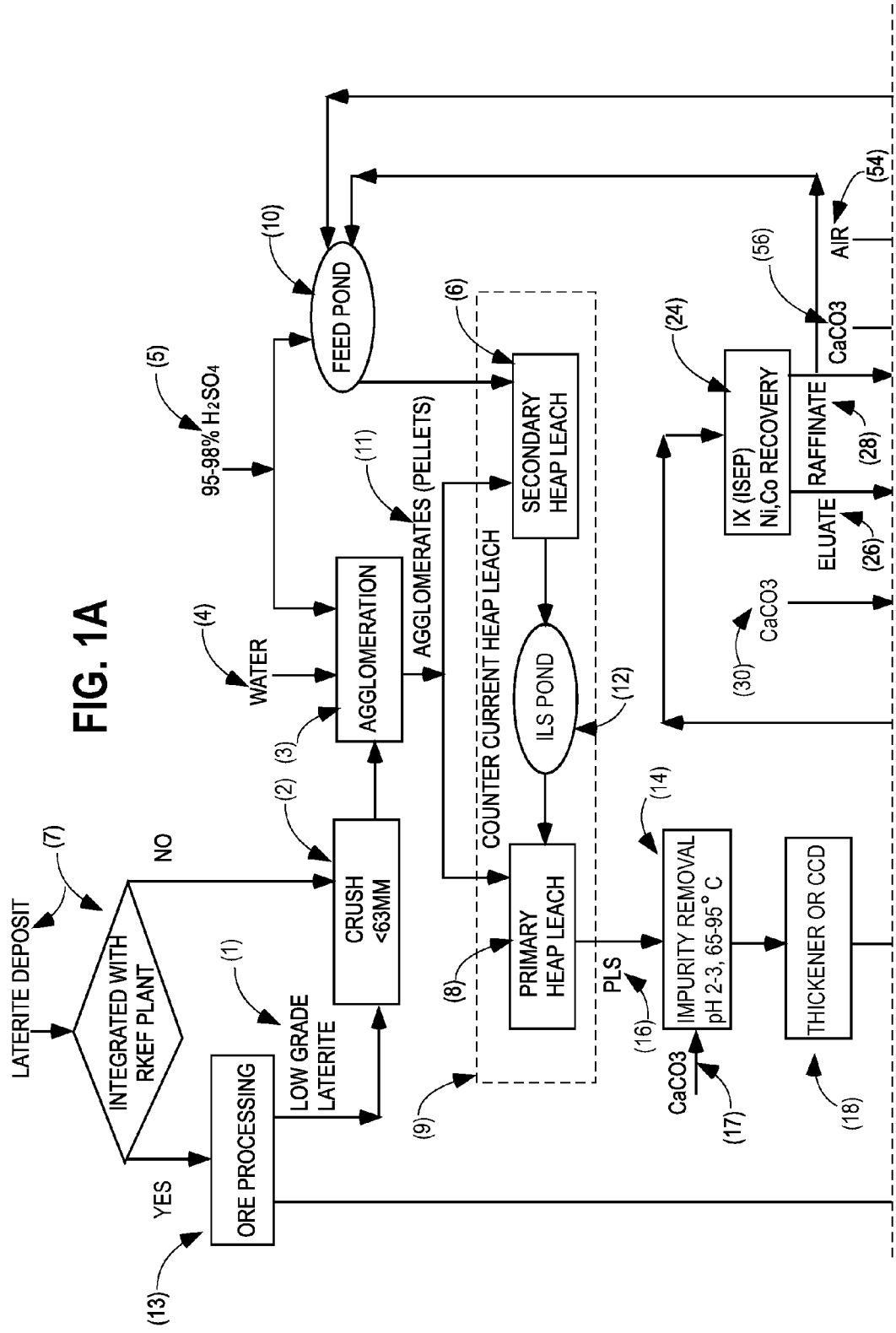
Figure 1B:
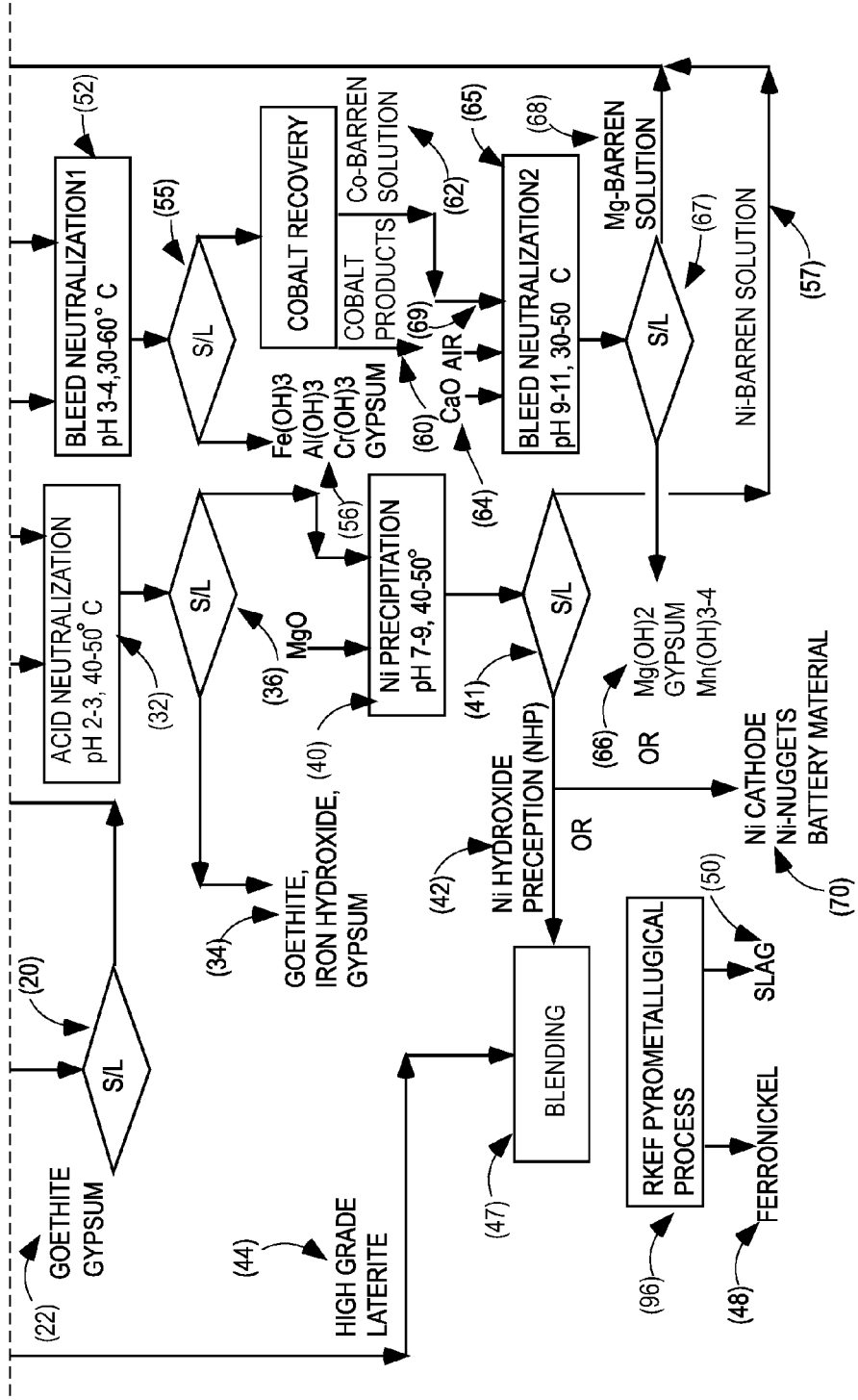

The present application will now be described with reference to the drawing (FIG. 1). It is to be understood that this drawing is illustrative of a preferred embodiment of the invention and that the invention is not intended to be limited to the embodiment described with reference to the drawing.

The Run-of Mine (ROM) ore from a nickeliferous lateritic deposit (7) may be either processed for integration into an RKEF process, or processed for other nickel products such as nickel cathodes, nickel nuggets, battery material or material for electric coatings. Where the ROM is processed for other nickel products other than in the RKEF process, the ROM ore (7), whether it be high or low grade nickeliferous lateritic ore, or a mixture thereof, may be first crushed to less than 63 mm (2) for processing. Where the ore is to be processed in an RKEF process, the ROM ore (7) is first processed (13) to separate it into two fractions, high grade nickeliferous lateritic ore (44) and low grade nickeliferous lateritic ore (1). The low grade ore is sent to crusher (2), while the high grade ore is feed material for the RKEF process.

In describing the embodiment where low nickeliferous ore is processed so that it may be added to the feed material for an RKEF process, the low grade ore with a nickel content of less than 1.5% wt and/or unsuitable $SiO_2$/MgO weight ratio is treated in a heap leach and subsequent processes. In the embodiment where the process is used to produce a value added nickel product, the ROM ore, whether high or low grade ore may be processed in the heap leach and subsequent processing.

The nickeliferous lateritic ore (1) is first crushed in a crushing process to less than 63 mm (2). The crushing process may include either a single crushing step or in some circumstances, secondary crushing or even tertiary crushing. The standard process is likely to include first crushing to about 180 mm in a primary crusher and then to about 63 mm in a secondary crusher.

The crushed ore is then agglomerated in a standard agglomeration apparatus (3). Recycled solution or water (4) is added together with concentrated sulfuric acid (95% wt to 98% wt) (5) to achieve agglomeration, although lower concentrations of sulfuric acid may also be used.

Preferably, the agglomerates (11) are arranged in a two stage counter current heap leach process (9). A secondary heap (6) and a primary heap (8) are established. The heap leach process operates by leaching the secondary heap with a sulfuric acidic lixiviant from a feed pond (10) to produce an intermediate leach solution (ILS). The ILS is gathered in an ILS pond (12) and depending upon the acidity of the ILS, if the ILS has a pH of less than about 2, it may be used as the lixiviant for the primary heap leach (8).

The ILS from the secondary heap leach or the ILS pond should be monitored for acidity, nickel and impurity ratios. If for example, the pH of the ILS is greater than 2, additional acid may be added to provide a pH of less than 2 for use in leaching the primary heap. Or alternatively, the ILS may simply be transferred to downstream processing and may be moved directly to the impurity removal step (14).

Impurities including almost all ferric iron and part of aluminium and chromium, are then removed from the PLS (16) as goethite or hydroxide by the addition of calcium carbonate (17) to raise the pH of the PLS to between 2 and 3 at a temperature of from 65° C. to 95° C. in impurity removal step (14). The slurry then passes through a thickener or counter current decantation (CCD) (18) and undergoes solid/liquid separation (20). The solid residue (22) contains goethite and gypsum and is discarded.

The nickel rich PLS, which is substantially free of ferric ions, then undergoes an ion exchange process (24) for the recovery of nickel. Preferably, the ion exchange device is an ISEP™ system. The ion exchange system is relatively specific for loading nickel with an iminodiacetic acid (IDA) chelating cation resin, such as Amberlite IRC 748™, Purolite S 930™, or Lewatit TP207™ or a bis-picolylamine (BPA) functional chelating resin Dowex M4195™ or its derivative Dowex XUS43578™ being the preferred resins, because of their high Ni selectivity and capacity. The Dowex 4195™ resin is able to selectively absorb nickel in preference to cobalt, aluminium, chromium, ferrous iron, manganese and magnesium. The ion exchange resin is stripped with an acidic solution with 150-250 g/L to produce a nickel concentrated IX eluate (26) while most of the cobalt and almost all of the aluminium, chromium, ferrous iron, manganese and magnesium remain in the raffinate (28).

The eluate containing the nickel is partially neutralized with calcium carbonate (30) in an acid neutralization step (32) to a pH of 2-3. Generally, this neutralization step takes place at around 40°-50° C. This would neutralize the free acid and precipitate partially the trace of ferric iron as goethite or iron hydroxide while gypsum is also disposed of as solid waste (34) after solid/liquid separation (36).

The eluate then undergoes a further neutralization with magnesium oxide (38) in a nickel hydroxide precipitation step (40) by raising the pH of the solution to about 7 to 9 at about 40° C. to 50° C. After solid/liquid separation (41), the obtained nickel hydroxide precipitate (NHP) (42) will generally have a nickel grade of higher than 30% wt. The nickel hydroxide precipitate may either then be blended (47) with the high grade nickeliferous lateritic ore (44) as feed for an RKEF pyrometallurgical process (46) or alternatively processed for other value added products such as nickel cathodes, nickel nuggets, battery materials or material for electric coatings (70). Ferronickel (48) is produced in the RKEF process with slag (50) disposed of as waste. The nickel barren solution (51) is then returned to the heap leach process via feed pond (10) and a portion is used as washing solution in nickel IX stage.

In order to recover cobalt, the nickel IX raffinate (28) is first partially neutralized to a pH of 3 to 4 at 30° C. to 60° C. (52) by the addition of calcium carbonate (53) and air (54). This neutralization step (52) will precipitate iron as goethite or hydroxide and aluminium and chromium as hydroxides. The impurities are disposed of together with gypsum as a solid waste (56) after solid/liquid separation (55). The cobalt will remain in solution and may be recovered, for example by either further ion exchange, for example with PBA-type resin Dowex M4195™, sulfidation or solvent extraction, for example with organic reagent Cyanex 272™ to produce cobalt products (60).

Figure 2:
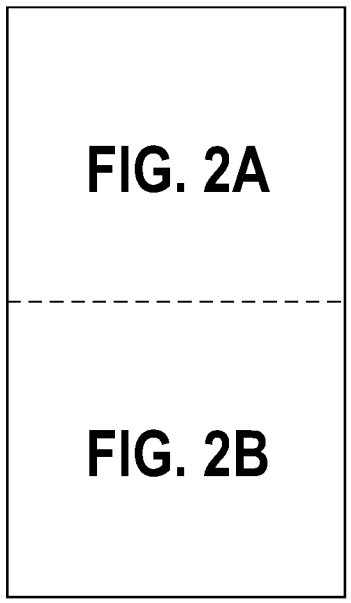
FIG. 2 discloses a flowsheet for the step of sequentially precipitating iron and aluminium from the nickel IX raffinate.
Figure 2A:
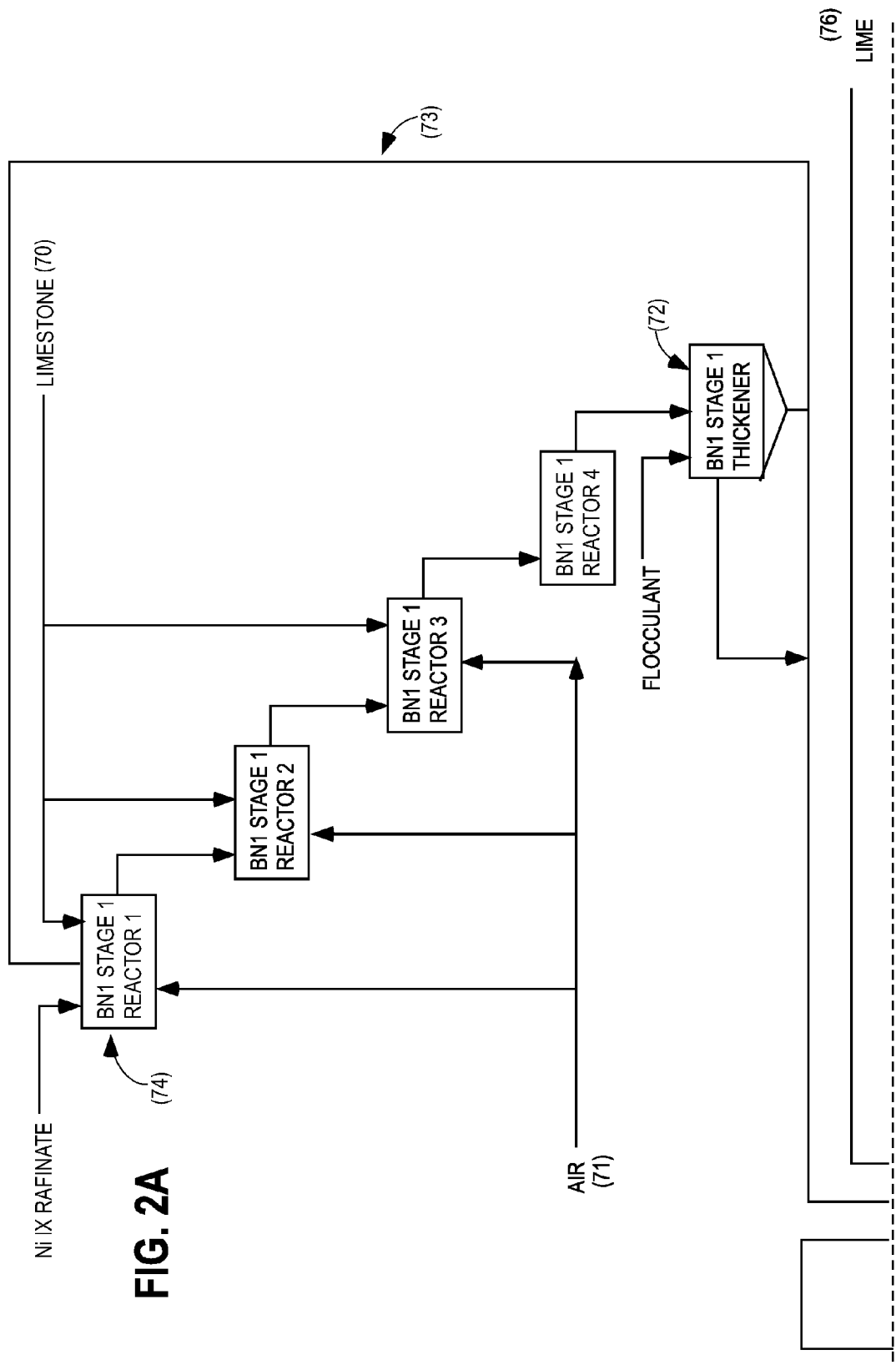
Figure 2B:
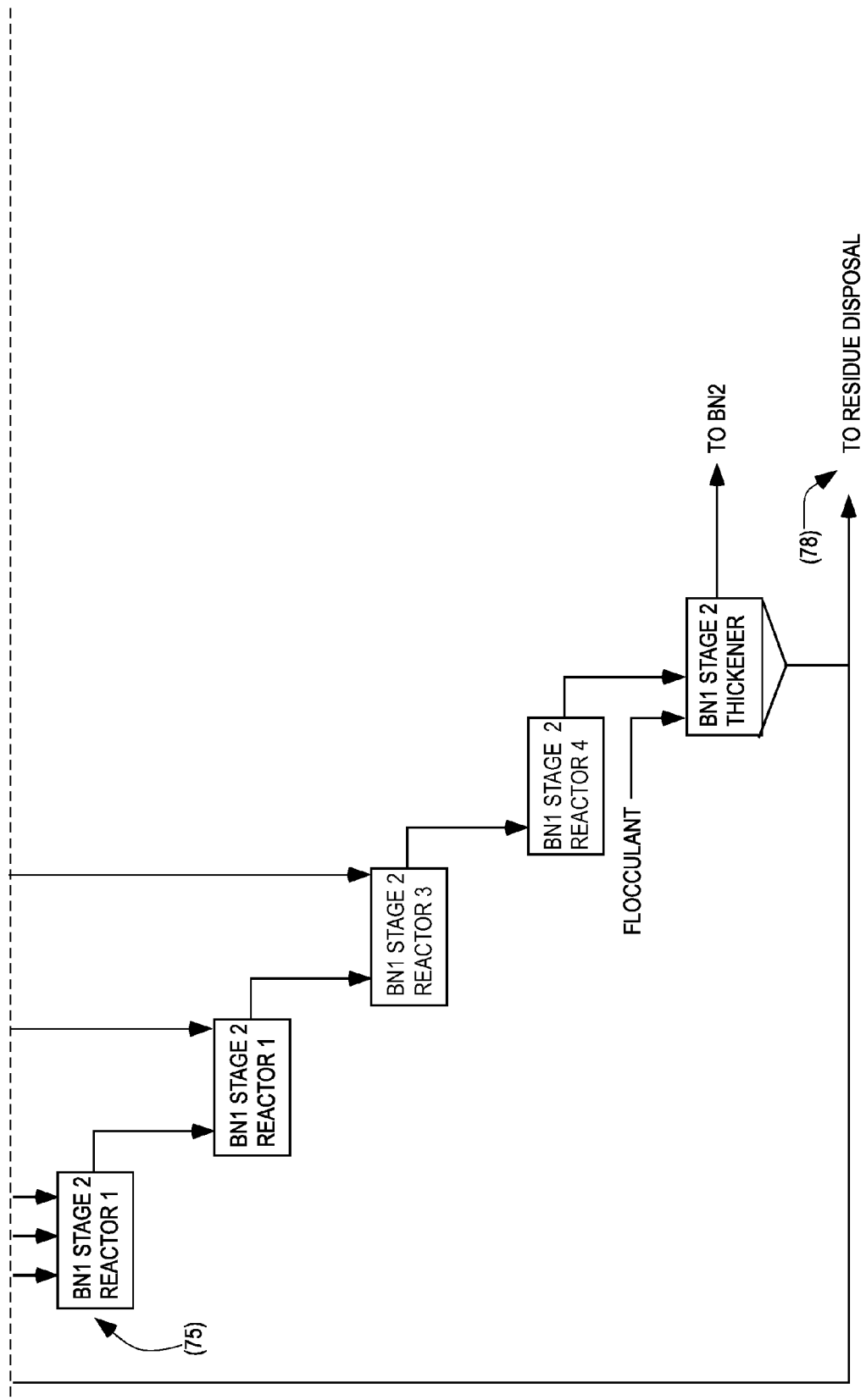

As an alternative, FIG. 2 illustrates an example of a two stage neutralization/precipitation concept for removal of iron and aluminium as hydroxide from the nickel IX raffinate. In the first stage, illustrated as BN1, the nickel IX raffinate is contacted with a limestone slurry (70) and air (71) at a pH of from 2 to 4, preferably 2.5 to 3 in order to precipitate ferric iron. The temperature is generally in the range of about 55° C. A thickener (72) is shown to recover some aluminium hydroxides that may have been precipitated at this stage with part of the underflow (73) recirculated back to the first reactor (74) for seeding and the over flow transferred to the second stage (75) of the precipitation process.

In the second stage, the pH is adjusted to from 5.0 to 6.5, preferably about a pH of 6 with the use of lime, the temperature is preferably greater than 95° C. It has been found that under these conditions, the remaining iron and the aluminium will precipitate in crystal form and produce a residue that is more readily filtered leading to disposal of the residue in a "stackable" form.

The cobalt barren solution (62) may undergo further neutralization with lime (64) to a pH of about 9 to 11 at 30° C. ambient temperate to 50° C. and aeration (69) in neutralization step (65) to remove magnesium and manganese as respective hydroxides together with gypsum (66) following solid/liquid separation (67). The barren solution (68) is then returned to the feed pond for use in the heap leach process.

The following examples are illustrative of preferred processes or steps in accordance with the invention described herein.

Example 1

Heap Leach with Low Grade Nickeliferous Lateritic Ore

A series of 5000-tone scale heaps with heights of 4 to 6 meters was operated with counter-current style with low grade nickeliferous lateritic ore. The ore was crushed to size of less than 63 mm and agglomerated with concentrated sulphuric acid with doses between 0 and 51 kg per ton dry ore. 50 Kg/t being the defined design criteria value. The applied irrigation flux was 5.0 Liter/(m$^2$·hr). Table 1 illustrates the ore composition and liquor compositions of intermediate pregnant solution (ILS) and pregnant leach solution (PLS). The concentration ratios of ferric over nickel in ore, ILS and PLS indicated that the iron control namely leaching selectivity was achieved. As a result the consumption of sulphuric acid and neutralizers in whole process was decreased.

TABLE 1

Composition of Ore, ILS and PLS (with reasonable ± limits indicated)

| | $H_2SO_4$ | Ni | Co | Al | $Fe^{+3}$ | $Fe^{+2}$ | Mg | Mn | Cr | $Fe^{+3}$/Ni |
|---|---|---|---|---|---|---|---|---|---|---|
| Ore % wt | — | 1.44 | 0.06 | 2.57 | 18.62* | 7.99* | 5.42 | 0.39 | 1.00 | 13.0/1.0 |
| | | (1.0-1.5) | (0.05-0.07) | (1.3-2.7) | (13.0-20.0) | (6.0-9.0) | (5.0-9.0) | (0.33-0.45) | (0.8-1.1) | (9.0-14.0) |
| ILS | 4.41 | 3.88 | 0.11 | 7.06 | 14.83 | 14.83 | 24.81 | 1.11 | 0.33 | 3.8/1.0 |
| g/L | (2.4-10.0) | (1.8-4.4) | (0.058-0.17) | (4.1-8.0) | (10.0-22.0) | (10.0-22.0) | (15.0-44.0) | (0.8-2.4) | (0.15-0.4) | (2.5-5.5) |
| PLS | 0.76 | 4.27 | 0.26 | 6.54 | 5.00 | 14.14 | 29.23 | 2.01 | 0.42 | 1.2:1.0 |
| g/L | (0.5-1.5) | (2.4-4.8) | (0.08-0.6) | (4.1-7.5) | (0.0-5.0) | (7.1-20.0) | (15.0-45) | (1.0-5.7) | (0.0-0.60) | (0.0-1.2) |

Example 2

Impurity Removal (IR) to Precipitate Ferric Ions as Goethite and/or Hydroxide

Pregnant leach solution (PLS) and neutralizer (limestone) slurry were pumped in impurity removal (IR) stage that included a series of agitation tanks to neutralize free acid and precipitate ferric ion $Fe^{+3}$ as goethite and/or hydroxide at pH 2.4 to 3.2 and 85° C. After solid/liquid separation inside thickener, the overflow was sent for nickel recovery with IX (ion exchange) and the underflow slurry was filtered as solids cake then disposed. The compositions of IR feed solution, thickener overflow and filter cake are shown in Table 2. The precipitation efficiency of ferric ion is 95-98% whilst most of manganese and ferrous iron remained in liquor. Mineral investigation indicated that the major ferric compound in filter cake is goethite. The nickel and cobalt loss in IR were 2.7% and 5.0% respectively.

TABLE 2

Composition of IR Feed Solution Thickener Overflow and Filter Cake (with reasonable ± limits indicated)

|  | pH | Ni | Co | Al | $Fe^{+3}$ | $Fe^{+2}$ | Mg | Mn | Cr |
|---|---|---|---|---|---|---|---|---|---|
| Cake % wt | NA | 0.14 (0.1-0.2) | 0.02 (0.0-0.1) | 3.98 (3.5-4.5) | 6.10 (4.0-10.0) | NA | 0.13 (0.05-0.5) | 0.11 (0.05-0.16) | 0.41 (0.10-0.60) |
| Feed solution g/L | 0.76 (0.5-1.5) | 4.27 (2.4-4.8) | 0.26 (0.08-0.6) | 6.54 (4.1-7.5) | 5.00 (0.0-5.0) | 14.14 (7.1-20.0) | 29.23 (15.0-45) | 2.01 (1.0-5.7) | 0.42 (0.0-0.60) |
| Thickener Overflow g/L | 2.5-3.0 | 3.55 (3.0-4.0) | 0.21 (0.1-0.31) | 2.87 (2.0-3.5) | 0.095 (0.05-0.3) | 12.12 (8.0-20.0) | 28.31 (20.0-35.0) | 1.77 (1.3-2.10) | 0.072 (0.05-0.11) |

Example 3

Ion Exchange (IX) to Recover Nickel

Ion exchange (IX) with Dowex M4195™ resin was used to separate, recover and concentrate nickel from impurities such as aluminium, ferrous $Fe^{+2}$, magnesium, manganese and chromium. The thickener overflow from Impurity Removal (IR) was fed into ISEP™ device that included 30 fixed bed columns settled on a carousel. These thirty columns were divided into several groups with various functions such as absorption (loading), load washing, entrainment rejection, stripping and stripping washing. The stream flow rates to each group and dwell time of carousel were calculated with given feed solution composition, resin effective capacity (g Ni/L resin), nickel flow (g Ni/hour) through ISEP™ device and nickel recovery. Table 3 summarizes the average compositions of the major streams in ISEP™ operation. It indicates that nickel was concentrated into eluate stream and almost all impurities were rejected into raffinate. The nickel recovery is >97%.

TABLE 3

Composition of Major Streams in ISEP ™ Operation (with reasonable ± limits indicated)

|  | Ni g/L | Co g/L | Al g/L | $Fe^{+3}$ g/L | $Fe^{+2}$ g/L | Mg g/L | Mn g/L | Cr g/L |
|---|---|---|---|---|---|---|---|---|
| Feed | 3.55 (3.0-4.0) | 0.212 (0.1-0.31) | 2.87 (2.0-3.5) | 0.095 (0.05-0.3) | 12.11 (8.0-20.0) | 28.29 (20.0-35.0) | 1.77 (1.3-2.10) | 0.072 (0.05-0.11) |
| Raffinate | 0.088 (0.050-0.18) | 0.16 (0.08-0.24) | 2.57 (1.8-3.2) | 0.034 (0.01-0.06) | 10.87 (8.5-18.0) | 27.40 (19.0-34.0) | 1.66 (1.2-2.0) | 0.065 (0.04-0.09) |
| Eluate | 33.23 (29.0-35.0) | 0.37 (0.15-0.45) | 0.00 (0.0-0.1) | 0.54 (0.25-1.5) | 0.28 (0.2-0.5) | 10.19 (8.0-12.0) | 0.00 (0.0-0.1) | 0.00 (0.0-0.1) |

Example 4

Production of Nickel Hydroxide Precipitate (NHP)

The obtained IX eluate that contains high nickel concentration was firstly mixed with limestone slurry in agitation tanks to neutralize the free acid and partially precipitate residual ferric ions as goethite or hydroxide at pH 2.0-2.5 and temperature of 40-50° C. After solid/liquid separation the filtrate is neutralized with slurry of magnesium oxide at pH 7-9 and temperature of 40-50° C. to produce nickel hydroxide precipitate (NHP). The barren solution is recycled either to ISEP™ operation as washing solution or to heap leach as feed solution after acidification.

Table 4 illustrates the average composition of feed solution, barren solution and NHP.

TABLE 4

Composition of Feed and Barren Solution and Product of NHP (with reasonable ± limits applied)

|  | Ni | Co | Al | Tot. Fe | Mg | Mn | Cr |
|---|---|---|---|---|---|---|---|
| Feed Soln g/L | 30.17 (27.0-32.0) | 0.34 (0.11-0.42) | 0.00 (0.0-0.08) | 0.61 (0.40-1.6) | 10.59 (8.5-13.2) | 0.00 (0.0-0.1) | 0.00 (0.0-0.10) |
| Barren Soln. g/L | 0.51 (0.3-1.0) | 0.01 (0.005-0.015) | 0.00 (0.00-0.001) | 0.00 (0.00-0.001) | 18.86 (16.0-22.0) | 0.00 (0.00-0.001) | 0.00 (0.00-0.001) |

TABLE 4-continued

Composition of Feed and Barren Solution and Product of NHP (with reasonable ± limits applied)

|  | Ni | Co | Al | Tot. Fe | Mg | Mn | Cr |
|---|---|---|---|---|---|---|---|
| NHP cake % wt | 36.29 (33.0-38.9) | 0.41 (0.1-0.60) | 0.00 (0.0-0.3) | 0.75 (0.5-2.7) | 5.86 (1.5-8.5) | 0.002 (0.00-0.2) | 0.000 (0.00-0.037) |

Example 5

Bleeding Neutralization Stage 1 (BN1) of Ion Exchange Raffinate to Precipitate Iron, Aluminum and Chromium with Limestone and Aeration A part of IX raffinate described in Example 3 was bled for waste water treatment and disposal. The BN1 stage with limestone slurry and aeration at pH 4-7 and temperature of 50-55° to precipitate ferric ion, ferrous iron, aluminium, chromium and a part of manganese as waste solid. The selection of pH and temperature depends on the necessity of cobalt recovery, being pH 6.0 the corresponding value to no cobalt recovery case (79% Co losses in BN1 precipitated). Table 5 illustrates the composition of feed and barren solution without considering cobalt recovery. The barren solution with major impurities of magnesium and manganese was fed for $2^{nd}$ stage neutralization with lime slurry.

TABLE 5

Composition of Feed and Barren Solution of IX Raffinate Neutralization (with reasonable ± limits indicated) Stage 1

|  | Ni g/L | Co g/L | Al g/L | $Fe^{+3}$ g/L | $Fe^{+2}$ g/L | Mg g/L | Mn g/L | Cr g/L |
|---|---|---|---|---|---|---|---|---|
| Feed | 0.088 (0.050-0.18) | 0.16 (0.08-0.24) | 2.57 (1.8-3.2) | 0.034 (0.01-0.06) | 10.87 (8.5-18.0) | 27.40 (19.0-34.0) | 1.66 (1.2-2.0) | 0.065 (0.04-0.09) |
| Barren | 0.012 (0.01-0.036) | 0.022 (0.016-0.048) | 0.016 (0.01-0.032) | 0.00 (0.0001-0.0006) | 0.48 (0.595-1.26) | 21.07 (16.0-28.6) | 0.80 (0.78-1.30) | 0.004 (0.0036-0.0081) |

Example 6

Bleeding Neutralization Stage 2 (BN2) of Ion Exchange Raffinate to Precipitate Magnesium and Manganese with Lime and Aeration The magnesium- and manganese-containing solution described in Example 5 was further neutralized with lime slurry and aeration at pH 10-12 and temperature range of 55-60° C. The major solid products were magnesium hydroxide, manganese (III or VI) hydroxide and gypsum and disposed as waste. The barren solution is recycled to heap leach system. Table 6 illustrates the feed and barren solution.

TABLE 6

Composition of Feed and Barren Solution of IX Raffinate Neutralization (with reasonable ± limits indicated) Stage 2

|  | Ni g/L | Co g/L | Al g/L | $Fe^{+3}$ g/L | $Fe^{+2}$ g/L | Mg g/L | Mn g/L | Cr g/L |
|---|---|---|---|---|---|---|---|---|
| Feed | 0.012 (0.01-0.036) | 0.022 (0.016-0.048) | 0.016 (0.01-0.032) | 0.00 (0.0001-0.0006) | 0.48 (0.595-1.26) | 21.07 (16.0-28.6) | 0.80 (0.78-1.30) | 0.004 (0.0036-0.0081) |
| Barren | 0.00 | 0.00 | 0.00 | 0.00 | 0.00 | 0.258 (0.195-0.35) | 0.003 (0.001-0.003) | 0.00 |

Further modifications or additions to the process without departing from the ambit or spirit as described herein are also to be considered part of the process as described.

Further patent applications may be filed in Australia or overseas on the basis of or claiming priority from the present application. It is to be understood that the following provisional claims are provided by way of example only, and are not intended to limit the scope of what may be claimed in any such future application. Features may be added to or omitted from the provisional claims at a later date so as to further define or redefine the invention or inventions.

The invention claimed is:

1. A process for the production of a high grade nickel product comprising:
   a. providing at least a primary heap and a secondary heap of a nickeliferous lateritic ore and leaching at least the secondary heap with a lixiviant that includes a sulfuric acid solution to produce an intermediate leach solution, wherein at least part of the intermediate leach is solution is used to leach the primary heap in a counter current or part counter current heap leach process to produce a nickel rich pregnant leach solution (PLS);
   b. subjecting the PLS to an impurity removal step to precipitate ferric iron, and partially precipitate aluminum and chromium as hydroxides; and
   c. recovering a high grade nickel product from the PLS by at least one of nickel ion exchange, solvent extraction, electrowinning, multi-stage neutralization, pyrohydrolysis or sulfidation.

2. The process according to claim 1 wherein the PLS, substantially free of ferric ion, is subjected to a nickel ion exchange (IX) step to produce a nickel concentrated IX eluate and a nickel IX raffinate containing cobalt and rejected impurities including ferrous ion, aluminum, chromium, manganese and magnesium, wherein the nickel concentrated IX eluate is neutralized to produce a high grade nickel hydroxide precipitate.

3. The process according to claim 2 wherein the resin in the nickel IX step is selected from an iminodiacetic acid chelating cation resin or a bis-picolylamine functional chelating resin.

4. The process according to claim 3 wherein the nickel IX resin is stripped with a sulfuric acid or hydrochloric acid solution to produce a nickel concentrated nickel IX eluate.

5. The process according to claim 1 wherein the nickeliferous lateritic ore that is heap leached is a low grade nickeliferous lateritic ore and the process includes the steps that the high grade nickel product that is recovered is combined with a feed material for a Rotary Kiln and Electric Furnace (RKEF) plant and processed in an RKEF process.

6. The process according to claim 1 wherein ferric iron is removed from the nickel rich PLS as goethite and/or hydroxide by adjusting the pH level of the PLS to a pH of from 2 to 4 with calcium carbonate or limestone and by adjusting a temperature of the PLS to 65° C. to 98° C.

7. The process according to claim 1 wherein seawater or saline medium is used to precipitate ferric iron from the nickel rich PLS as jarosite by adjusting the pH to I to 2 with calcium carbonate or limestone and by adjusting a temperature of the PLS to 80° C. to boiling point.

8. The process according to claim 2 wherein residual ferric ions are partially removed from the nickel concentrated IX eluate by raising a pH of the nickel concentrated IX eluate to a pH of from 2 to 3 with a neutralizing agent and by adjusting a temperature of the nickel concentrated IX eluate to a temperature from 40° C. to 50° C. to precipitate the ferric iron as goethite or an iron hydroxide.

9. The process according to claim 8 wherein the nickel concentrated IX eluate is further neutralized with an agent selected from the group consisting of magnesium oxide, soda ash, caustic soda, or other alkali, to a pH of from 7 to 9 at 40-50° C., so as to precipitate nickel as a nickel hydroxide precipitate with a nickel grade of greater than 30% wt.

10. The process according to claim 1 wherein the high grade nickel product, substantially free of ferric ions, is further processed to make battery material, nickel nuggets, nickel cathode or crystalline nickel sulphate for electric coating.

11. The process according to claim 1 wherein ferrous iron and aluminium are precipitated from the nickel IX raffinate in a sequential manner; ferrous iron being oxidised and precipitated at a pH of from 2 to 3 in a first stage; and then the residual ferrous iron and aluminium is further precipitated at a pH of 5.0 to 6.5 in a second stage.

12. The process according to claim 11 where oxygen and/or air is added to the first stage to assist in oxidising any remaining ferrous to ferric.

13. The process according to claim 11 wherein the iron and aluminium are precipitated in a substantially crystalline form as hydroxides or oxides.

14. The process according to claim 13 wherein the iron is precipitated as goethite and/or magnetite.

15. The process according to claim 11 wherein cobalt is recovered from the partially neutralized nickel IX raffinate by either a cobalt ion exchange (IX), solvent extraction (SX) or sulfidation.

16. The process according to claim 15 wherein the resin in the cobalt IX process is a bis-picolylamine functional chelating resin and the solvent extraction reagent is Bis(2,4,4-trimethylpentyl)phosphinic acid or derivatives.

* * * * *